United States Patent

Santa Cruz et al.

[11] Patent Number: 6,164,725
[45] Date of Patent: Dec. 26, 2000

[54] DETACHABLE PASSENGER ARM REST FOR TWO WHEELED VEHICLES

[76] Inventors: Cathy D. Santa Cruz, 7630 Tholl Dr., Reno, Nev. 89506; Sheryl D. Janicek; Kelan J. Janicek, both of 5381 Coit Dr., Reno, Nev. 89523; Thane J. Janicek, 2800 Stine Way, Sparks, Nev. 89431

[21] Appl. No.: 09/265,077

[22] Filed: Mar. 9, 1999

[51] Int. Cl.[7] ............................................. B60N 2/46
[52] U.S. Cl. ........................ 297/411.29; 297/411.4; 297/411.37; 297/DIG. 6; 297/411.25
[58] Field of Search ........................ 297/411.2, 411.23, 297/411.25, 411.26, 411.29, 411.35, 411.37, DIG. 6; 280/288.4, 304.4, 727

[56] References Cited

U.S. PATENT DOCUMENTS

| | | |
|---|---|---|
| 2,418,092 | 3/1947 | Passel ................................. 297/227 |
| 2,602,488 | 7/1952 | Conning ............................. 297/411.25 |
| 2,650,650 | 9/1953 | Brown ................................ 297/411.25 |
| 2,725,928 | 12/1955 | Branick ............................. 297/411.25 |
| 3,853,351 | 12/1974 | Lassiter . |
| 3,940,166 | 2/1976 | Smithea . |
| 4,111,448 | 9/1978 | Sklodowsky . |
| 4,440,331 | 4/1984 | Schimmels . |
| 4,834,457 | 5/1989 | Head .............................. 297/411.25 X |
| 5,009,467 | 4/1991 | McCoy .......................... 297/411.26 X |
| 5,553,915 | 9/1996 | Stamolokis . |

FOREIGN PATENT DOCUMENTS

| | | | |
|---|---|---|---|
| 317711 | 12/1919 | Germany .......................... 297/411.25 |

Primary Examiner—Milton Nelson, Jr.

[57] ABSTRACT

A bracket which is easily attached to the pre-existing backrest of a two wheeled vehicle for converting the passenger seat into an armchair.

2 Claims, 3 Drawing Sheets

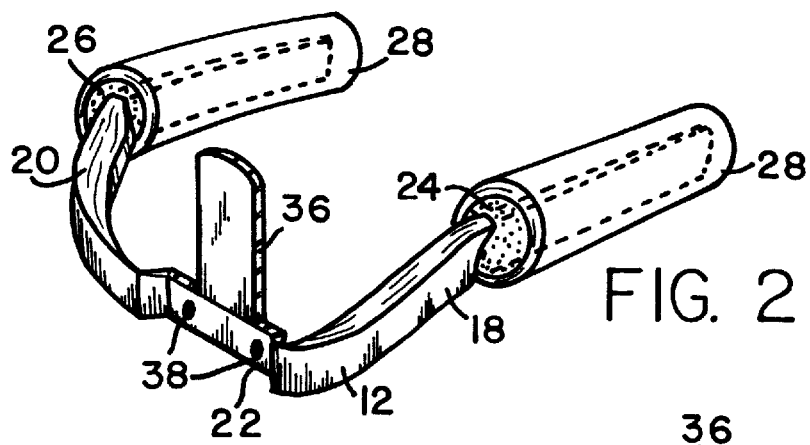
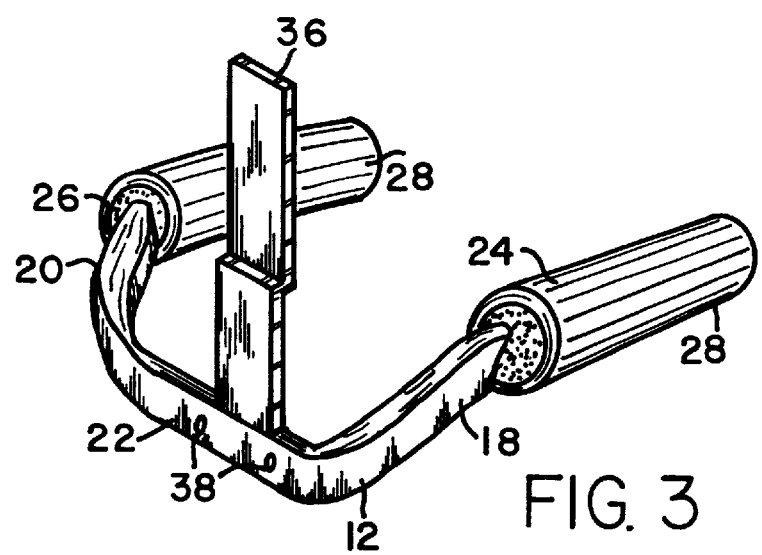
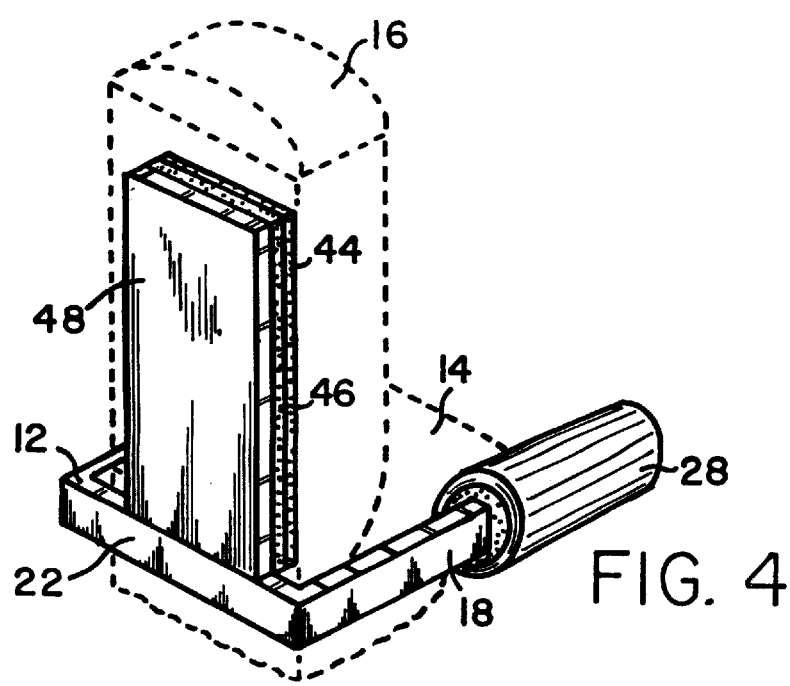

DETACHABLE PASSENGER ARM REST FOR TWO WHEELED VEHICLES

FIELD OF THE INVENTION

The present invention relates to removable accessory items used on two wheeled vehicles, but more particularly relates to a bracket which is easily attached to the preexisting back rest for converting the passenger seat into an armchair.

BACKGROUND OF THE INVENTION

With today's heightened interest in outdoor activities it has become very popular to carry a passenger along while riding a two wheeled vehicle, such as a motorcycle or the like. Unfortunately, most passenger seats are normally designed for adult use only and cannot be used safely for children.

Also, most accessory items for passenger seats require the user to modify the existing vehicle in some manner, such as holes must be drilled, or multiple brackets or straps must be installed.

For example U.S. Pat. No. 4,111,448 entitled "MOTORCYCLE PASSENGER SUPPORT" is somewhat functional for its intended use, but it is much too complicated, is difficult to install, the motorcycle must be modified, and the device is not designed for different types of motorcycles.

Another example is taught in U.S. Pat. No. 3,940,166, entitled "AUXILIARY RETENTION BELT AND SUPPORT CUSHION FOR SEAT OF OPEN VEHICLES". Again, this device is somewhat functional but has inherent disadvantages which the present invention overcomes. Such as, this device uses multiple straps, cushions, bolts, etc., all of which the present invention eliminates. Also, this device would be uncomfortable for the operator as the passenger is literally strapped to the operator, and this is not only cumbersome but could be very dangerous as well.

Other examples include U.S. Pat. Nos. 3,425,745, 4,440,331, and 5,553,915 each of which are somewhat functional but each have inherent disadvantages which the present invention recognizes and overcomes in a manner heretofore not taught.

Such as, none of the references recognize or address the laws associated with carrying passengers, especially children. Whereas, the present applicants have investigated such laws, and it is clear that children can be passengers as there is no specified minimum age limit. However, they must have a legal motorcycle helmet, their feet must be supported on foot pegs, and the child must be on the passenger seat. Therefore, all but the '448 reference would be considered illegal, thus inoperative.

Also, none of the prior art references provide a detachable arm rest which is adjustable in a manner that allows the chair to accept different sized passengers, or is adjustable as the passenger grows.

SUMMARY OF THE INVENTION

Thus, it is therefore an object of the present invention to provide a detachable passenger arm rest for two wheeled vehicles which overcomes inherent disadvantages associated with the known prior art.

Another object of the present invention is to provide a detachable passenger arm rest for two wheeled vehicles that is suitable for use by adults as well as children of different sizes.

Also another object of the present invention is to provide a detachable passenger arm rest for two wheeled vehicles which includes arm cushions for comfort and support.

Still a further object of the present invention is to provide a detachable passenger armchair for two wheeled vehicles which may include removable washable covers for the noted arm cushions.

Yet another object of the present invention is to provide a detachable passenger arm for two wheeled vehicles which is easily mounted on the vehicle and does not require modification of the pre-existing vehicle in any manner.

Still another object of the present invention is to provide a detachable passenger arm rest for two wheeled vehicles which is aesthetically pleasing.

Also, a very important object of the present invention is to provide a detachable passenger arm rest for two wheeled vehicles which is a retrofit, and is easily attachable to substantially any two wheeled vehicle having a back rest, respectively.

Yet another object of the present invention is to provide a detachable passenger arm rest and adjustable foot pegs in combination for two wheeled vehicles which complies with Highway Patrol regulations.

Also another object of the present invention is to provide a detachable passenger arm rest for two wheeled vehicles that is attachable with only one bracket.

Other objects and advantages will be seen when taken into consideration with the following drawings and specification.

BRIEF DESCRIPTION OF THE DRAWINGS

FIG. 2 is substantially a perspective view of the preferred embodiment as depicted in FIG. 1.

FIG. 3 is substantially a perspective view of a second embodiment for the present invention.

FIG. 4 is substantially a partial plan view of a third embodiment for the present invention.

DETAILED DESCRIPTION OF THE DRAWINGS

Referring now in detail to the drawings wherein like characters refer to like elements throughout the various views.

The present invention is substantially a detachable passenger arm rest for use in connection with a two wheeled vehicle having a seat (14) with an attached back rest (16). Such as a motorcycle, bicycle, or the like, and includes different embodiments which will be described within the following specification.

Figure 1:
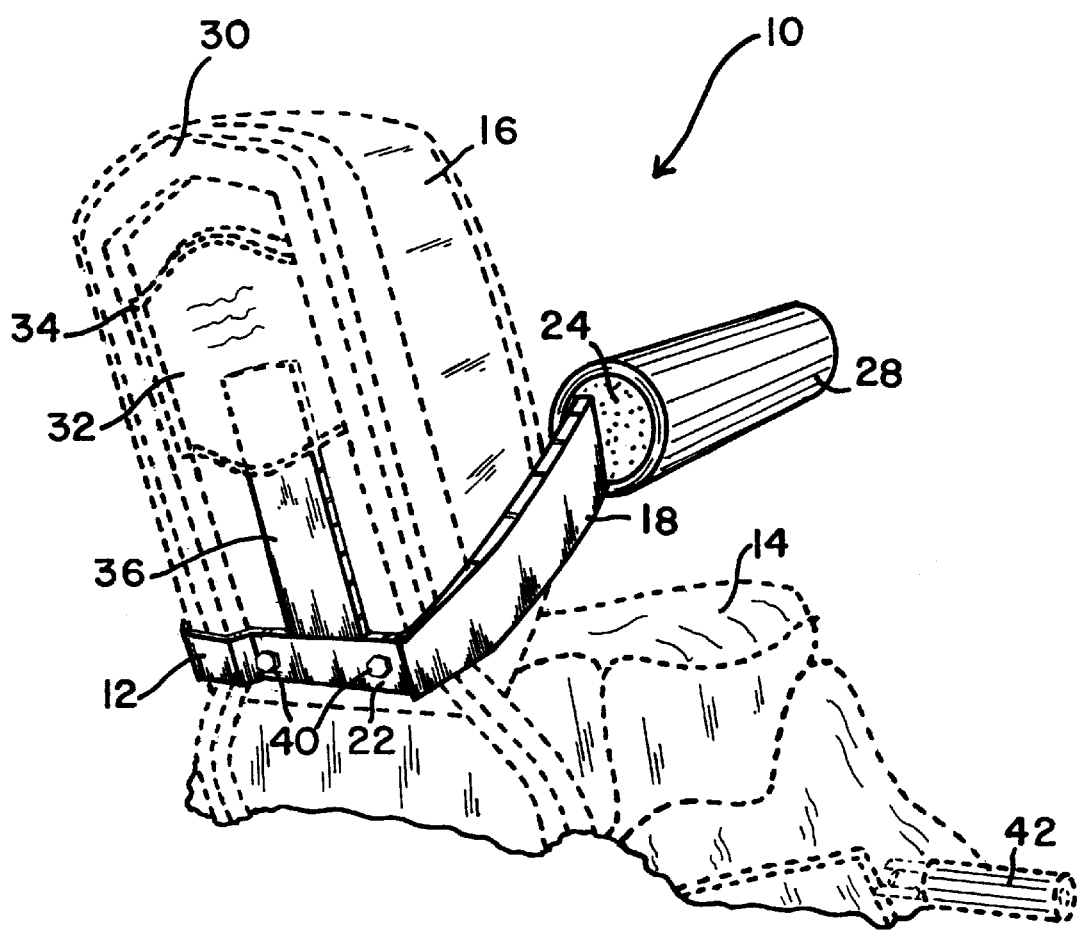
FIG. 1 is substantially a perspective overview of the preferred embodiment of the present invention.

In FIG. 1, (arrow 10) represents an overview of the preferred embodiment for the present invention, respectively. Wherein, (12) is a bracket substantially in the shape of a "U", having a right leg (18), a left leg (20) (shown in FIGS. 2, 3 & 4) and a central interconnecting section (22).

Right leg (18) and left leg (20) being substantially spaced apart and parallel to each other, respectively. With right leg (18) being of a shape and size to slidably receive a right cushion (24) thereon, and left leg (20) being of a shape and size to slidably receive a left cushion (26) thereon. Also, if so desired each cushion (24 & 26) may include a removable washable protective outer sleeve (28).

It is to be understood that cushions (24 & 26) can be made from any suitable material of engineering choice, such as foam rubber, or the like. Also, each sleeve (28) can be made from any suitable material of engineering choice, such as vinyl, plastic, cloth, or the like.

Furthermore, interconnecting section (22) of bracket (12) includes attachment means for removably attaching arm rest (arrow 10) to the pre-existing backrest (16), with the noted attachment means being described later herein.

Figure 5:
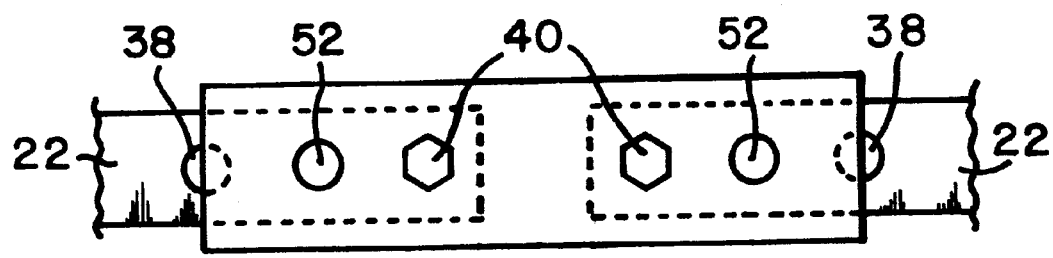
FIG. 5 is substantially a frontal view of an extension member and illustrates one position for the device.
Figure 6:
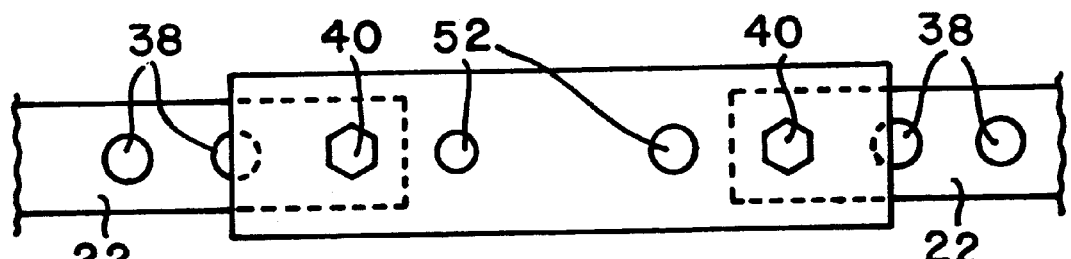
FIG. 6 is substantially a frontal view of an extension member and illustrates a second position for the device.

It is to be understood that bracket (12) can be made from substantially any suitable material of engineering choice, such as wood, plastic, nylon, sheet metal, pipe, steel tubing, etc., and may be integrally formed, such as taught within the preferred embodiment as depicted in FIGS. 1, 2, & 3. Or bracket (12) may be formed from two halve sections, as depicted in FIGS. 5 & 6 and later described.

It is to be understood that bracket (12) is substantially a retrofit as depicted in FIG. 1. As bracket (12) can be attached to substantially any typical backrest (16) of choice. However, if so desired we also provide various embodiments and options wherein reshaping of bracket (12) allows the present invention to be easily mounted on different types of back rests and sissy bars, see the following specification.

Referring now to FIG. 1 which represents the preferred embodiment for the present invention. Wherein, we show a pre-existing seat (14), a typical pre-existing backrest (16) that is further supported by a pre-existing sissy bar (30). With sissy bar (30) further including a pre-existing emblem (32) and a pre-existing emblem mounting pad (34), such as normally found on motorcycles of the "SOFTSAIL" design. As can clearly be seen in this embodiment, interconnecting section (22) of bracket (12) is bent into a shape that conforms and mates with the inside surface of sissy bar (30). Whereby, interconnecting section (22) when mounted will fit in a flush manner against backrest (16).

Furthermore, shown in FIG. 1, interconnecting section (22) further includes an upright support member (36) that is of a shape and size to be slidably engaged substantially beneath the pre-existing emblem mounting pad (34), thus further securing arm rest (arrow 10) when installed.

Also in this embodiment, we show the attachment means for removably attaching arm rest (arrow 10) to pre-existing backrest (16) comprising interconnection section (22) having multiple bores (38) there through which are of a shape and size to threadably receive a threaded fastener (40) therein. With pre-existing backrest (16) having mounting holes (not shown) which are of a shape and size to mate with multiple bores (38).

It can now clearly be seen that arm rest (arrow 10) is removably attached to backrest (16) when multiple bores (38) and mounting holes (not shown) are aligned and attached together by fastener (40).

It is to be understood that fastener (40) may be pre-existing and originally used for securing sissy bar (30) to the backrest (16). Or if preferred, fastener (40) may be of the known type used for connecting wood and metal together.

Further shown in FIG. 1, it is to be understood arm rest (arrow 10) may be manufactured and sold in combination with a pair of foot pegs (42) as a conversion kit for converting a passenger seat (14) into an arm chair with foot pegs (42). Whereby, the conversion kit when installed, provides the passenger with an armchair that complies with Highway Patrol Regulations. Still further, if so desired right leg (18) and left leg (20) may be curved. Whereby, right cushion (24) and left cushion (26) can be positioned at the desired location of engineering choice. It is to be understood that if so desired arm rest (arrow 10) can be installed without upright support (36).

Referring now to a different embodiment as depicted in FIG. 4, wherein armrest further includes an upright attachment plate (48), with the attachment means for removably attaching arm rest (arrow 10) to a pre-existing backrest (16) being a hook fastener (44) and a loop fastener (46). With hook fastener (44) being fixedly attached to the backside of backrest (16) at a location of user choice. While loop fastener (46) is fixedly attached to upright attachment plate (48). Whereby, arm rest (arrow 10) is removably attached to backrest (16) when hook fastener (44) and loop fastener (46) are manually pressed together. It is to be understood that this embodiment is substantially functional for attaching the arm rest (arrow 10) to any typical backrest (16) of choice.

Referring now to FIG. 2 wherein we show arm rest (arrow 10) having an upright support member (36) which is of a different height. Whereby, arm rest (arrow 10) can be easily installed on a pre-existing sissy bar (30) having a shorter height. Such as sissy bar upright part #52764-90, on page 123 of Harley Davidson magazine 1999.

Yet another embodiment is depicted in FIG. 3, wherein interconnecting section (22) includes an upright support member (36) which is substantially bent into a shape and size to be slidably engaged beneath pre-existing emblem mounting pad (34). This embodiment is functional for different styles of sissy bars, such as part #52655-84, #99013-82, or #52774-82A, as shown on page 123 of Harley Davidson magazine 1999.

Referring now to FIGS. 5 & 6 wherein we show interconnecting section (22) is severed. Thus, bracket (12) is formed from two halve sections. With the halve sections being adjustably interconnected together by an extension member (50), with extension member (50) having multiple holes (52) there through which are of a shape and size to mate with multiple bores (38) and multiple mounting holes (not shown) on backrest (16). Whereby, when bracket (12) is mounted to backrest (16) using extension member, bracket (12) is adjustable between various widths of user choice. For example, in FIG. 5, we show extension member (50) being attached to bracket (12) by fastener (40) when in a first position, while in FIG. 6 we show extension member (50) being attached to bracket (12) by fastener (40) when in a second position. This embodiment is most functional for use when different sized passengers are commonly transported. As this embodiment allows different passengers to use the same arm rest (arrow 10).

Figure 7:
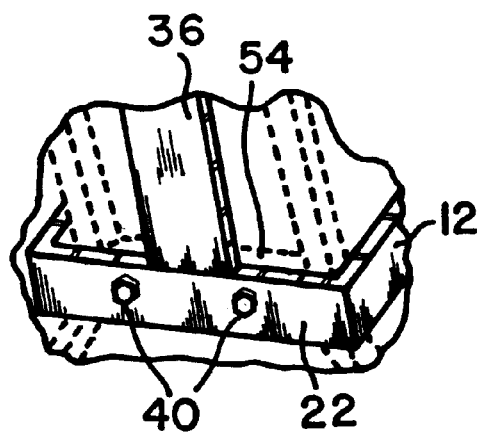
FIG. 7 is substantially a partial perspective view of the present invention when installed with a sissy bar having a cross member.

It is to be further understood that some sissy bars (30) also include a pre-existing cross member having multiple mounting holes (not shown). Thus, another embodiment is illustrated in FIG. 7, and includes central interconnecting section (22) having multiple bores (38) there through which are of a shape and size to mate with multiple mounting holes on cross member (54) and interconnecting section (22) of arm rest (arrow 10) and cross member (54) are removably attached to backrest (16) by multiple mounting bolts (40).

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described our invention, what we claim as new and wish to secure by Letters Patent is:

1. A detachable passenger arm rest for use in connection with a two wheeled vehicle having a seat with an attached back rest, said arm rest comprising: a bracket substantially in the shape of a U, said bracket having a right leg, a left leg, and a central interconnecting section; said right leg and said left leg being substantially spaced apart and parallel to each other, said right leg being of a shape and size to slidably receive a right cushion thereon, said left leg being of a shape and size to slidably receive a left cushion thereon, said central interconnecting section having an upright attachment plate fixedly attached thereon, and said attachment plate being removably attachable to said backrest by a hook and loop fastener.

2. A detachable passenger arm rest for use in connection with a two wheeled vehicle having a seat with an attached back rest and sissy bar, said arm rest comprising: a bracket substantially in the shape of a U, said bracket having a right leg, a left leg, and a central interconnecting section; said right leg and said left leg being substantially spaced apart and parallel to each other, said right leg being of a shape and size to slidably receive a right cushion thereon, said left leg being of a shape and size to slidably receive a left cushion thereon, said sissy bar having a cross member, said cross member having multiple mounting holes, said interconnecting section having multiple bores there through, and said mounting holes and said multiple bores being of a shape and size to threadably receive multiple mounting bolts therein, whereby:

said cross member and said interconnecting section are fixedly attachable to said backrest.

\* \* \* \* \*